Patented June 14, 1932

1,862,589

UNITED STATES PATENT OFFICE

HENRY DREYFUS, OF LONDON, ENGLAND

MANUFACTURE OF CELLULOSE ESTERS

No Drawing. Original application filed April 18, 1923, Serial No. 633,016, and in Great Britain May 24, 1922. Divided and this application filed January 20, 1926. Serial No. 82,624.

This application is a division of the application of Henry Dreyfus, S. No. 633,016 filed April 18, 1923.

This invention relates to the manufacture of new fatty acid esters of cellulose, in particular cellulose acetates, from cellulose or its near conversion products, which latter are hereinafter included under the term cellulose.

In previous U. S. Patents Nos. 1,278,885, 1,280,974, and 1,280,975 and British Patents 14,101 of 1915, 6,463 of 1915 101,555 and 100,009 I have described processes for the manufacture of cellulose acetates which are very viscous and produce very viscous solution.

The present invention aims to make new cellulose acetates, which are more viscous than the products obtained according to my said patents or any known process, and capable of giving whether as primary esterification products or products of further transformation, stronger and better artificial silk or other technical products than any heretofore obtainable with fatty acid esters of cellulose.

Acetic acid is usually employed as solvent or diluent in processes of acetylating cellulose, but sometimes no acetic acid is used.

I have discovered that the acetic acid plays an important part in the production of very viscous products and does not serve merely as a solvent or diluent as has hitherto been supposed. This is evidenced by the fact that the acetylation solution obtained by my process hereinafter described is at least as viscous as the acetylation solution obtained under otherwise similar conditions by prior processes, although the dilution may be at least 2 to 3 times as great or more.

I have also found that the quantity of acetic anhydride taken in excess of that required for the acetylation also plays an important part.

The use of an increased proportion of acetic acid in conjunction with sulphuric acid or other strong condensing agent in the acetylation of cellulose forms the subject matter of the parent specification S. No. 633,016.

The present invention relates to the use of quantities of acetic anhydride in excess of that necessary for acetylation.

It has hitherto been supposed not only that acetic anhydride has a good effect on the acetylation reaction when used in excess in any circumstances, but that it can also be used in such quantities that the excess serves as the solvent or diluent without employment of acetic acid or other solvent or diluent for this purpose, and this without detriment to the quality of the acetylation products obtained. Careful investigation has shown that this is not the case when employing the quantities of sulphuric acid or other condensing agents which have hitherto been employed for acetylation, and further that the quantity of acetic anhydride can play a very important part in the manufacture of the highly viscous cellulose acetates obtainable according to the present invention. If, for example, in using 15% of sulphuric acid calculated on the weight of the cellulose, one employs acetic anhydride alone, i. e. both as acetylating agent and diluent, in a total quantity of about the bulk of the mixture of acetic anhydride and acetic acid hitherto previously employed, (say for instance if one takes acetic anhydride in an amount of say 6 times the weight of the cellulose), it will be found that the resulting acetylation product is much less viscous than when a relatively small excess of acetic anhydride is used together with acetic acid as diluent. The product thus obtained also becomes relatively very much thinner very quickly afterwards.

If the acetylation is performed with larger quantities of acetic anhydride alone, with employment of such a quantity of sulphuric acid as above mentioned, then one will see the difference in a much more pronounced form on comparing the result with the results obtainable with the use of increased quantities of acetic acid as diluent together with relatively small quantities of acetic anhydride. For example, if under the same conditions instead of taking acetic acid in an amount 8 times the weight of the cellulose, plus acetic anhydride in an amount 2½ times the weight of the cellulose, making a total of acetic acid and acetic anhydride which is 10½ times the weight of the cellulose, one acetylates with acetic anhydride alone in this total amount, one will observe that the acetylation solution so produced is relatively very thin. This however is less pronounced if the quantity of strong condensing agents, such as sulphuric acid, is reduced say to 10%, 5%, 2% or less, and it is also less pronounced when much weaker condensing agents (e. g. neutral sulfates such as ammonium sulfates) are used which may even require some heating, especially if used in small quantity. This shows what an important part the proportions of the acetic acid and acetic anhydride play, and that all the bodies used and the quantities used, have a substantial influence on the final quality of product obtained, especially from a viscosity point of view. It seems as if, with the quantities of sulphuric acid usually employed when acetic anhydride is used in substantial excess of the amount necessary for real acetylation, the acetic anhydride acts very quickly in a depolymerizing and degrading manner on the cellulose.

According to the present invention, therefore, the acetylation is conducted in the presence of a quantity of an organic solvent non-esterifiable by acetic anhydride not less than about 8 times the weight of the cellulose, said solvent being wholly or in part composed of acetic anhydride. The total quantity of acetic anhydride employed is accordingly in excess of that required for the acetylation. The amount of acetic anhydride necessary for acetylation (i. e. the amount consumed in the acetylation) is 3 gram molecules of acetic anhydride for each gram molecule of cellulose calculated as $C_6H_{10}O_5$. The amount of acetic anhydride additional to that necessary for acetylation, hereinafter termed the excess acetic anhydride, does not enter into chemical combination with the cellulose, but functions as solvent. If a strong condensing agent such as sulphuric acid is employed, the proportion should be less than that customarily adopted and should not exceed 10%, preferably 5%, 2% or less, by weight of the cellulose. In the case of weak condensing agents, the usual proportion of such condensing agents may be employed, but in this case also, a smaller proportion may be used with advantage.

If, for example, one takes any increased quantity of total solvent, including the excess of acetic anhydride over that necessary for acetylation, for instance 8 times the weight of the cellulose, it will be found that in following the above indications, the conditions being otherwise similar to those explained in my above British patents, especially 14,101/1915, 6,463/1915 or 100,009, solutions can be obtained which are of high viscosity in spite of their increased dilution, as compared with solutions obtained with much less solvent, for example only four times the weight of the cellulose. The quantity of total solvent can be increased with advantage to more than 8 times the weight of the cellulose or conversion products, e. g. to 10 or 12 times and more as desired.

The increased dilution has a further advantage in that the control of the heat evolved by the reaction, which is very great when sulphuric acid or strong condensing agents are used, is much more in hand and can be regulated much more easily.

In addition to a more efficient temperature control, the use of an increased amount of total solvent also enables the hydration of the cellulose before the actual acetylation sets in to be more easily regulated—this without attacking or substantially attacking the cellulose.

When sulphuric acid or strong condensing agents are employed in the acetylation, similar principles to those explained in my British Patents 14,101/1915 or 6,463/1915 or U. S. Patents 1,278,885 or 1,280,975 may be applied as regards starting at low temperatures or cooling down the mixture to low temperatures before introducing the cellulose into it and then gradually letting the temperature rise. The hydration of the cellulose before acetylation is still more complete in the increased dilution as before explained and can be more easily executed, and a much quicker acetylation can be effected. The more the dilution is increased the more it also allows the process to be carried on without excessive cooling being required, and without cooling to the low temperatures indicated in said prior patents, although the latter is less advantageous. Thus, for starting up, one need not cool down so much, or one can even work at ordinary temperature with water cooling or, depending upon the amount of dilution, even without cooling, as the small rise in temperature which may then take place does not have such a detrimental effect.

With weaker condensing agents higher temperatures may be employed than with sulphuric acid or other strong condensing agents and heat may even be applied as mentioned before and in my previous patents.

It is to be understood that the acetic acid used as part of the total solvent for the acetylation may be wholly or partly replaced by other suitable acids or solvents, or that acetic acid or such other acids or solvents may be partly replaced by solvents or liquids such as chloroform or tetrachlorethane or even diluents such as carbon tetrachloride, trichlorethylene, benzol, etc., so long as with such solvents, diluents or mixtures one is able to get a solution by acetylation. However the employment of such other solvents or diluents is not so advantageous as the use of acetic acid alone as solvent. Solvents or diluents that are capable of being converted into esters by means of fatty acid anhydrides are obviously unsuitable for use in the present process. The solvents, diluents or mixtures above referred to must be employed in such quantities as give an increased or greatly increased dilution of the esterification mass as compared with the quantity of acetic acid hitherto usually employed.

The acetic anhydride of the applicant's process can be replaced by other anhydrides of fatty acids to produce the corresponding esters.

The best results are obtained by using sulphuric acid as the condensing agent. However, instead of sulphuric acid as condensing agent any other suitable condensing agent may be employed, for example bisulphates containing small quantities of sulphuric acid as explained in my British Specification 100,009, or bisulphates alone in the cold, or sulphates like aniline sulphate, or (with heating) ammonium sulphate or ammonium bisulphate; or any other suitable condensing agents known, may be used, the conditions of the reaction, especially as regards temperature, being adapted accordingly.

The acetic anhydride of the applicant's process can be replaced by other anhydrides of fatty acids to produce the corresponding esters.

While the reaction can be speeded up and the solubility characteristics of the acetylation products changed according to the increased amounts of sulphuric acid or other condensing agents employed, the use of such larger amounts of sulphuric acid or other condensing agents necessitates a much more careful control of the reaction temperatures. This is particularly true when sulphuric acid or other strong condensing agents are used.

The exact order in which the various reagents can be added to the cellulose may be varied. The cellulose may be first treated with acetic acid alone, either with heating or in the cold, and then sulphuric acid or other strong condensing agent, preferably diluted with acetic acid, is added at ordinary temperature or with cooling, and the acetic anhydride then introduced. If desired the cellulose may be first treated with acetic acid alone, and then the acetic anhydride added, the sulphuric acid or strong condensing agent being only added afterwards to the cooled mass; or the cellulose may be introduced into the mixture of acetic acid, acetic anhydride and sulphuric acid or other condensing agent. Other variations and modifications will readily suggest themselves and are included within the scope of the invention. When sulphuric acid or other strong condensing agents are employed the mass should preferably be cooled to below 5° C., or more advantageously to 0° C. or lower, at the beginning of the esterification or when the cellulose comes in contact with the esterifying agent and sulphuric acid or other strong condensing agent.

The reaction according to the present invention may also be executed in suspension. In the latter case the cellulose is preferably treated beforehand with a mixture of acetic acid, or corresponding diluent or mixture, containing the condensing agent, and afterwards introduced into a mixture of the excess quantity of the acetic anhydride and a given non-solvent diluent, such as benzol or carbon tetrachloride or any other suitable diluent employed in sufficient quantity to prevent solution of the cellulose.

In order to speed up the reaction the cellulose or cellulose conversion product may receive a pretreatment with concentrated or dilute acetic acid or other organic (fatty) acid at ordinary temperature or with cooling or at elevated or even boiling temperatures. The acid preferably, should contain small quantities of sodium acetate or other suitable agents capable of neutralizing any mineral acid which may be present, since the latter would have a destructive effect on the cellulose molecule when high temperatures are used. The duration of this treatment and the temperature utilized will depend on the acid used and its concentration. The details of this pretreatment are here omitted since it forms the subject matter of a divisional application.

*Example 1*

100 parts by weight of cellulose, for example cotton, are introduced into a mixture of 100 to 1500 parts by weight of acetic anhydride, and 2 to 5% of sulphuric acid relatively to the weight of the cellulose, this mixture having been first cooled down to 0° C.; the temperature is allowed to rise gradually, cooling being continued until complete solution. If desired, the temperature towards the end of the reaction may be allowed to rise to 25° C. or 30° C. or even somewhat more to finish the reaction. The product can be isolated and employed as such or be submitted to a secondary or further treatment. The isolation of the product from the acetylation solution may be effected by precipitating it in water or with water or with diluents, such as carbon tetrachloride and so forth.

*Example 2*

100 parts by weight of cellulose, for example cotton, are introduced into a precooled mixture of 500 to 750 parts by weight of acetic anhydride, 500 to 750 parts by weight of acetic acid, and 2 to 5 parts by weight of sulphuric acid. The temperature of the reaction mixture is allowed to rise gradually until the acetylation is complete.

The primary cellulose acetates obtained according to the present invention can either be used directly as such for any technical purposes, like the manufacture of artificial silk, celluloid-like masses, films, varnishes, etc., especially when they are directly soluble in acetone or dilute acetone; or they may be first submitted to a further or secondary treatment or reaction either in the original esterification solution or after isolation therefrom, and either in solution or suspension.

Such further or so-called secondary treatment may be along the lines indicated in my British Patents 20,977/1911 and 20,852/1912 or my U. S. Patents 1,217,722 and Reissue 14,338.

More particularly the anhydride may be destroyed and the condensing agent neutralized partially or completely and the secondary treatment may then be effected either at ordinary temperature or at a higher temperature, that is to say, in the presence of free organic acids only, as explained in my U. S. Patent 1,217,722, page 4, lines 93-129.

It is to be understood, however, that the various solubilities developed in the secondary reaction or treatment of the products of the present invention do not necessarily correspond to those developed in the products obtained according to my said previous U. S. Reissue Patent No. 14,338 and Patents 1,278,885, 1,280,974 and 1,280,975 and my British Patents 20,977/1911, 14,101/1915, 6,463/1915 and 100,009.

Further any other processes of secondary reaction or further treatment may be applied to the primary esterification products obtained according to the present invention.

What I claim and desire to secure by Letters Patent is:—

1. Process for the manufacture of cellulose esters characterized in that cellulose is esterified by means of an esterification medium comprising 3 gram molecules of fatty acid anhydride for each gram molecule of cellulose calculated as $C_6H_{10}O_5$, a further quantity of an organic liquid not less than 8 times the weight of the cellulose, said organic liquid functioning as solvent and comprising an amount of fatty acid anhydride in addition to the three molecular proportions above specified and a quantity of condensing agent so adjusted in accordance with the quantity of fatty acid anhydride that cellulose esters of very high viscosity are produced.

2. Process for the manufacture of cellulose esters characterized in that cellulose is esterified by means of an esterification medium comprising 3 gram molecules of fatty acid anhydride for each gram molecule of cellulose calculated as $C_6H_{10}O_5$, a further quantity of an organic liquid not less than 8 times the weight of the cellulose, said organic liquid functioning as solvent and comprising an amount of fatty acid anhydride in addition to the three molecular proportions above specified together with an organic solvent non-esterifiable by fatty acid anhydride, and a quantity of condensing agent so adjusted in accordance with the quantity of fatty acid anhydride that cellulose esters of very high viscosity are produced.

3. Process for the manufacture of cellulose esters characterized in that cellulose is esterified by means of an esterification medium comprising 3 gram molecules of fatty acid anhydride for each gram molecule of cellulose calculated as $C_6H_{10}O_5$, a further quantity of an organic liquid not less than 8 times the weight of the cellulose, said organic liquid functioning as solvent and comprising an amount of fatty acid anhydride in addition to the three molecular proportions above specified together with acetic acid and a quantity of condensing agent so adjusted in accordance with the quantity of fatty acid anhydride that cellulose esters of very high viscosity are produced.

4. Process for the manufacture of cellulose esters characterized in that cellulose is esterified by means of an esterification medium comprising 3 gram molecules of fatty acid anhydride for each gram molecule of cellulose calculated as $C_6H_{10}O_5$, a further quantity of an organic liquid not less than 8 times the weight of the cellulose, said organic liquid functioning as solvent and comprising an amount of fatty acid anhydride in addition to the three molecular proportions above specified and not more than 10% of a strong condensing agent relatively to the weight of the cellulose.

5. Process for the manufacture of cellulose esters characterized in that cellulose is esterified by means of an esterification medium comprising 3 gram molecules of fatty acid anhydride for each gram molecule of cellulose calculated as $C_6H_{10}O_5$, a further quantity of an organic liquid not less than 8 times the weight of the cellulose, said organic liquid functioning as solvent and comprising an amount of fatty acid anhydride in addition to the three molecular proportions above specified together with acetic acid, and not more than 10% of sulfuric acid relatively to the weight of the cellulose.

6. Process for the manufacture of cellulose acetate characterized in that cellulose is acetylated by means of an acetylation medium comprising the quantity of acetic anhydride necessary for the acetylation, a further quantity of an organic liquid not less than 8 times the weight of the cellulose, said organic liquid functioning as solvent and comprising, as to a proportion thereof ranging from a small percentage to 100%, an excess of acetic anhydride over that necessary for the acetylation, and not more than 10% of sulfuric acid relatively to the weight of the cellulose.

7. Process for the manufacture of cellulose acetate characterized in that cellulose is acetylated by means of an acetylation medium comprising the quantity of acetic anhydride necessary for the acetylation, a further quantity of an organic liquid not less than 8 times the weight of the cellulose, said organic liquid functioning as solvent and comprising an excess of acetic anhydride over that necessary for the acetylation together with acetic acid, and not more than 10% of sulfuric acid relatively to the weight of the cellulose.

8. Process for the manufacture of cellulose acetate characterized in that cellulose is acetylated by means of an acetylation medium comprising the quantity of acetic anhydride necessary for the acetylation, a further quantity of an organic liquid not less than 8 times the weight of the cellulose, said organic liquid functioning as solvent and comprising, as to a proportion thereof ranging from a small percentage to 100%, an excess of acetic anhydride over that necessary for the esterification, and 1 to 5% of sulfuric acid relatively to the weight of the cellulose.

9. Process for the manufacture of cellulose acetate characterized in that cellulose is acetylated, at a temperature not exceeding 35° C. during the acetylation, by means of an acetylation medium comprising the quantity of acetic anhydride necessary for the acetylation, a further quantity of an organic liquid not less than 8 times the weight of the cellulose, said organic liquid functioning as solvent and comprising, as to a proportion thereof ranging from a small percentage to 100%, an excess of acetic anhydride over that necessary for the acetylation, and a quantity of a condensing agent not more than equivalent in activity to 10% of sulfuric acid relatively to the weight of the cellulose.

10. Process for the manufacture of cellulose acetate characterized in that cellulose is acetylated, at a temperature not exceeding 35° C. during the acetylation, by means of an acetylation medium comprising the quantity of acetic anhydride necessary for the acetylation, a further quantity of an organic liquid not less than 8 times the weight of the cellulose, said organic liquid functioning as solvent and comprising an excess of acetic anhydride over that necessary for the acetylation together with acetic acid, and 1 to 5% of sulfuric acid relatively to the weight of the cellulose.

11. Process for the manufacture of cellulose acetate characterized in that cellulose is acetylated by means of an acetylation medium comprising the quantity of acetic anhydride necessary for the acetylation, a further quantity of an organic liquid not less than 8 times the weight of the cellulose, said organic liquid functioning as solvent and comprising, as to a proportion thereof ranging from a small percentage to 100%, an excess of acetic anhydride over that necessary for the acetylation, and not more than 10% of sulfuric acid relatively to the weight of the cellulose, the initial temperature being between 0° C. and ordinary temperature.

12. Process for the manufacture of cellulose acetate characterized in that cellulose is acetylated by means of an acetylation medium comprising the quantity of acetic anhydride necessary for the acetylation, a further quantity of an organic liquid not less than 8 times the weight of the cellulose, said organic liquid functioning as solvent and comprising, as to a proportion thereof ranging from a small percentage to 100%, an excess of acetic anhydride over that necessary for the acetylation, and not more than 10% of sulfuric acid relatively to the weight of the cellulose, a non-solvent diluent being added in sufficient quantity to prevent solution of the cellulose acetate by the organic solvent liquid.

13. Process for the manufacture of cellulose acetate characterized in that cellulose is acetylated by means of an acetylation medium comprising the quantity of acetic anhydride necessary for the acetylation, a further quantity of an organic liquid not less than 8 times the weight of the cellulose, said organic liquid functioning as solvent and comprising, as to a proportion thereof ranging from a small percentage to 100%, an excess of acetic anhydride over that necessary for the acetylation, and not more than 10% of sulfuric acid relatively to the weight of the cellulose, and the resulting cellulose acetate is subjected to further treatment to modify its solubility characteristics.

14. Process for the manufacture of cellulose acetate characterized in that cellulose is acetylated by means of an acetylation medium comprising the quantity of acetic anhydride necessary for the acetylation, a further quantity of an organic liquid not less than 8 times the weight of the cellulose, said organic liquid functioning as solvent and comprising an excess of acetic anhydride over that necessary for the acetylation together with acetic acid, and 1 to 5% of sulfuric acid relatively to the weight of the cellulose, and the resulting cellulose acetate is subjected to further treatment in the presence of an acetic anhydride destroying agent to modify its solubility characteristics.

In testimony whereof I have hereunto subscribed my name.

HENRY DREYFUS.